(12) United States Patent
Kubozuka et al.

(10) Patent No.: US 6,252,371 B1
(45) Date of Patent: Jun. 26, 2001

(54) DRIVING CIRCUIT OF STEPPING MOTOR

(75) Inventors: Eiji Kubozuka; Hitoshi Ando, both of Gunma (JP)

(73) Assignee: Japan Servo Co. Ltd., Tokyo (JP)

( * ) Notice: Subject to any disclaimer, the term of this patent is extended or adjusted under 35 U.S.C. 154(b) by 0 days.

(21) Appl. No.: 09/563,219

(22) Filed: May 2, 2000

(30) Foreign Application Priority Data

May 7, 1999 (JP) .................................................. 11-126965
Jun. 22, 1999 (JP) .................................................. 11-175189

(51) Int. Cl.[7] .................................................. H02P 8/00
(52) U.S. Cl. .................................................. 318/696; 318/254
(58) Field of Search .................................................. 318/254, 685, 318/696, 138

(56) References Cited

U.S. PATENT DOCUMENTS

| | | | |
|---|---|---|---|
| 4,673,856 | * 6/1987 | Takaishi | 318/696 |
| 4,760,320 | * 7/1988 | Tsugita | 318/696 |
| 5,075,610 | * 12/1991 | Harris | 318/254 |
| 5,541,487 | * 7/1996 | Yorozu | 318/254 |
| 6,046,560 | * 4/2000 | Lu et al. | 318/254 |

* cited by examiner

*Primary Examiner*—Khanh Dang
(74) *Attorney, Agent, or Firm*—Nilles & Nilles SC

(57) ABSTRACT

A driving circuit of a stepping motor comprises an excitation control circuit connected to windings of a stepping motor, a driver circuit consisting of power switching transistors at a positive terminal side of a power source and of power switching transistors at a negative terminal side of the power source for controlling the excitation control circuit, a Zener diode inserted between the power source and a power input terminal of the driver circuit, and Zener diodes inserted between output terminals of the driver circuit and control signal input terminals of the power switching transistors at the positive terminal side of the power source, respectively. The Zener voltage of the Zener diode for the power switching transistor is determined to a value not less than a voltage difference between the voltage of the power source and the maximum rated voltage of the driver circuit.

3 Claims, 2 Drawing Sheets

DRIVING CIRCUIT OF STEPPING MOTOR

FIELD OF THE INVENTION

This invention relates to a driving circuit of a stepping motor and, more particularly, relates to an improvement of a driving circuit of a stepping motor for driving the stepping motor at a high speed.

DESCRIPTION OF THE PRIOR ART

Referring to FIG. 2, a conventional driving circuit of a stepping motor will be described. In FIG. 2, a reference symbol Vm denotes a direct current electric power source. U1 denotes a driver circuit connected to the direct current electric power source Vm. Tr1 to Tr3 denote power switching transistors at the positive terminal side of the direct current electric power source Vm. Tr4 to Tr6 denote power switching transistors at the negative terminal side of the direct current electric power source Vm. R1 denotes a current detection circuit. M denote windings of the stepping motor. According to the conventional driving circuit, six power switching transistors Tr1 to Tr6 form an excitation control circuit, which is driven by an output current from the driver circuit U1, so that three windings M of the stepping motor are excited in order and that the stepping motor is driven.

As shown in FIG. 3, the driver circuit U1 comprises six output switching transistors Pd1 to Pd6, a commutation logic signal generation circuit C for forming a three-phase exciting sequence of an exciting current signal to be applied to input terminals of the switching transistors Pd1 to Pd6 in order, a PWM (pulse width) control circuit P for controlling the excitation control circuit, resistances Ru connected between output terminals of the output switching transistors Pd1 to Pd3 and a power input terminal Vcc of the driver circuit U1, and resistors Rd connected between the output terminals of the output switching transistors Pd4 to Pd6 and a ground, an output of the PWM control circuit P being applied to control input terminals of the output switching transistors Pd1 to Pd3. In case that either one of the power switching transistors Tr1 to Tr3 is to be turned ON, a constant output current is supplied from one of output terminals U, V, W to corresponding one of the output switching transistors Pd1 to Pd3.

In case that either one of the power switching transistors Tr1 to Tr3 is to be turned OFF, a constant output SINK current is supplied from one of the output switching transistors Pd1 to Pd3 to corresponding one of the output terminals U, V, W. In these cases, the voltages at the output terminals of the output switching transistors Pd1 to Pd3 are substantially the same with the voltage at the power input terminal Vcc of the driver circuit U1.

In general, there is such a problem that if the driving frequency of the stepping motor is increased, the build up of the current is delayed due to the effect of the inductance of the windings M, the effective current is reduced, the torque is reduced, and the synchronism is lost. In order to solve the problem, it is generally adopted that the number of turn of the windings M is reduced so as to reduce the inductance. However, it is unfavorable, because there is such a problem that the holding torque which is determined by the ampere-turn of the stepping motor is decreased.

An another measure to solve the problem is to increase the voltage of the electric power source. According to the measure, it is possible to operate the stepping motor with a large torque in the range from the lower frequency to the higher frequency. However, if the voltage of the electric power source is increased, the voltage of the driver circuit U1 might over the maximum rated voltage of the driver circuit U1 so that the driver circuit U1 becomes inoperative or damaged.

In order to prevent such accident from being occurred, it may be considered that an exclusive electric power source for the driver circuit U1 is used, or a driver circuit of the stepping motor corresponding to a higher voltage is used. However, such exclusive electric power source or the driver circuit is not a general purpose goods, so that it is expensive.

SUMMARY OF THE INVENTION

In order to solve the foregoing problems in the conventional driving circuit of the stepping motor, it is an object of the present invention to provide a driving circuit of a stepping motor using a common electric power source and a general purpose driver circuit, which is operable in a wide frequency range.

It is another object of the present invention to provide a driving circuit of a stepping motor comprising an excitation control circuit connected to windings of a stepping motor, a driver circuit consisting of power switching transistors at a positive terminal side of a power source and of power switching transistors at a negative terminal side of the power source for controlling the excitation control circuit, a Zener diode inserted between the power source and a power input terminal of the driver circuit, and Zener diodes inserted between output terminals of the driver circuit and control signal input terminals of the power switching transistors at the positive terminal side of the power source, respectively, wherein the Zener voltage of the Zener diode for the power switching transistor is determined to a value not less than a voltage difference between the voltage of the power source and the maximum rated voltage of the driver circuit.

It is a further object of the present invention to provide a driving circuit of a stepping motor, wherein the number of the power switching transistors at the positive side of power source is selected to be three, and the number of the power switching transistors at the negative side of power source is selected to be three.

It is yet another object of the present invention to provide a driving circuit of a stepping motor, wherein the number of the windings of the stepping motor is selected to be three.

These and other objects and features of the present invention will become apparent from the following description in conjunction with the attached drawings.

DESCRIPTION OF THE PREFERRED EMBODIMENTS

Figure 1:
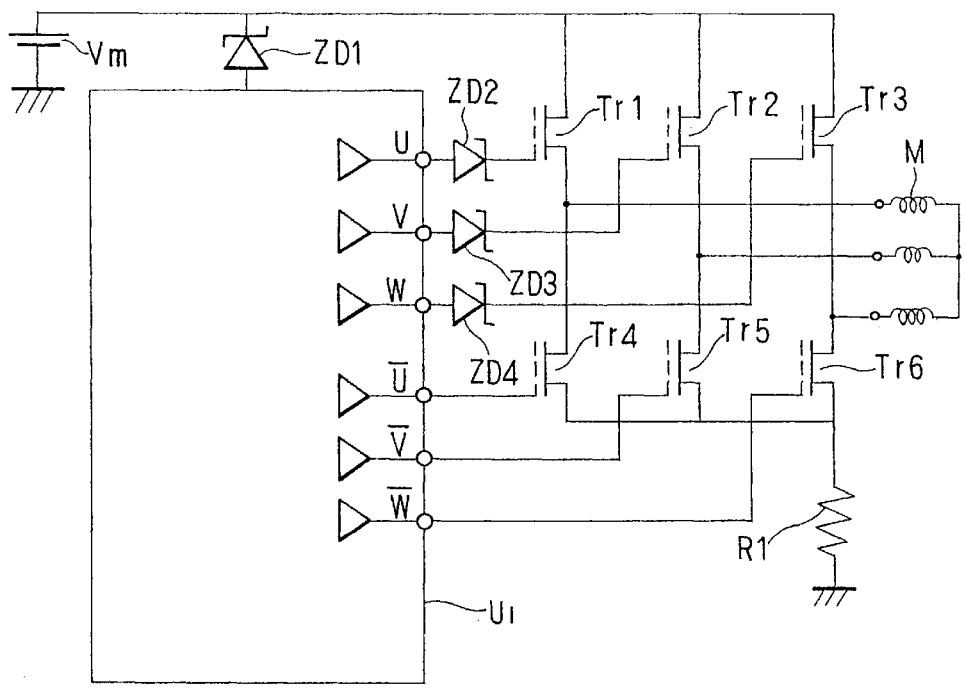
FIG. 1 is a schematic diagram of an essential portion of a driving circuit of a stepping motor according to the present invention.
Figure 2:
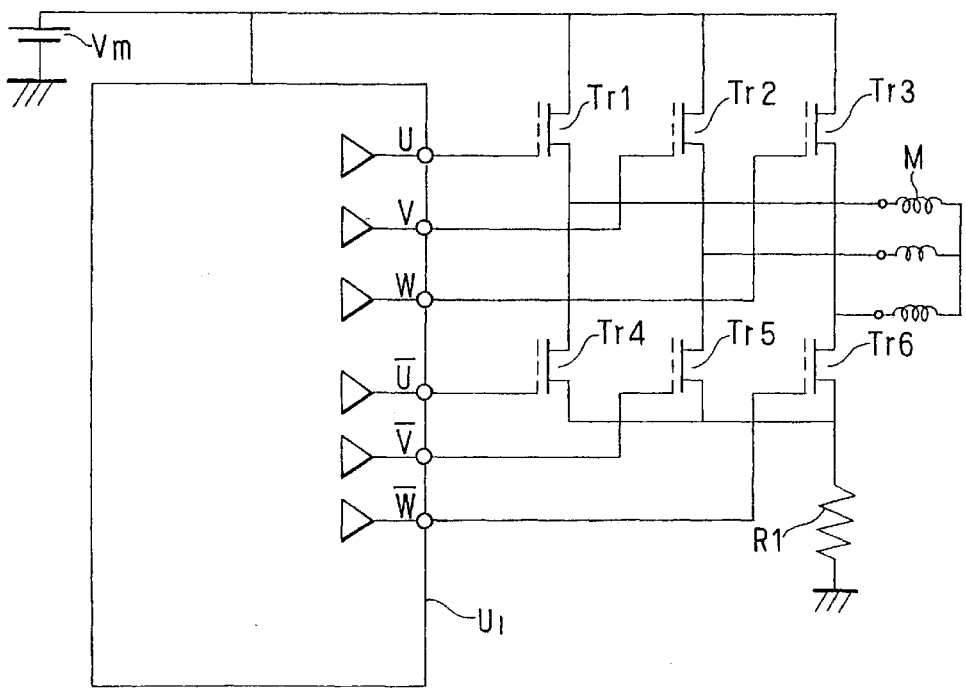
FIG. 2 is a schematic diagram of an essential portion of a driving circuit of a conventional stepping motor.
Figure 3:
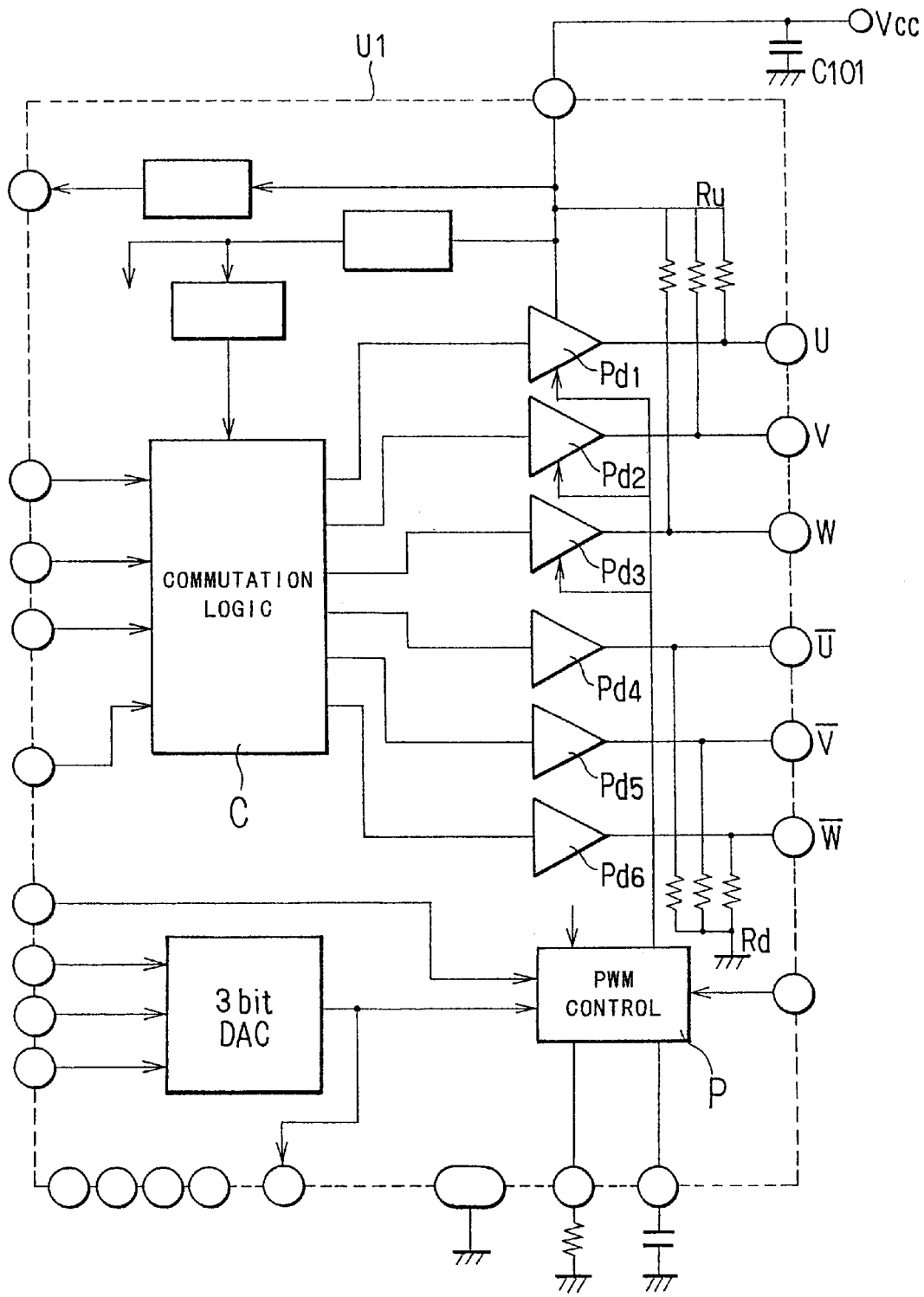
FIG. 3 is a schematic diagram of a driver circuit of the conventional stepping motor.

According to the present invention of a driving circuit of a stepping motor, as shown in FIG. 1, a direct current electric power source Vm of a high voltage is provided. A Zener diode ZD1 is inserted between a power input terminal Vcc of a driver circuit U1 and the direct current electric power source Vm. Zener diodes ZD2 to ZD4 are inserted between output terminals of the driver circuit U1 and control signal input terminals of power switching transistors Tr1 to Tr3 at the positive terminal side of the direct current electric power source Vm, respectively.

A Zener voltage of each of the Zener diodes ZD1 to ZD4 is set higher than a voltage difference between the voltage of the electric power source Vm and the maximum rated voltage of the driver circuit U1.

In the driving circuit U1 of the present invention, an input voltage of the driver circuit U1 is limited to a value not higher than the maximum rated voltage of the driver circuit U1 due to the function of the Zener diode ZD1, ever if the voltage of the electric power source Vm is higher than the maximum rated voltage of the driver circuit U1, so that the driver circuit U1 can be operated steadily.

According to the present invention, further, an electric power source Vm of a higher voltage can be used, so that it is possible to apply a higher voltage to windings M of the stepping motor, to increase the current flowing through the windings M against the impedance thereof, to generate a large torque even if the driving frequency is increased, and to drive the stepping motor at a higher speed with a larger torque.

When the power switching transistor is turned OFF, the output voltage of the driver circuit U1 becomes equal substantially to the input voltage at the power input terminal Vcc of the driver circuit U1. As the Zener diode ZD1 is inserted between the power input terminal Vcc and the electric power source Vm, the output voltage of the driver circuit U1 becomes lower by the Zener voltage of the Zener diode ZD1 than the voltage of the electric power source Vm. Accordingly, the voltage at the control signal input terminal of each of the power switching transistors Tr1 to Tr3 at the positive terminal side of the electric power source Vm becomes lower than a voltage at a terminal of each of the power switching transistors Tr1 to Tr3 connected to the electric power source Vm, so that undesirably each of the power switching transistors Tr1 to Tr3 of ON state is remained in the ON state.

In order to prevent the power switching transistors Tr1 to Tr3 at the positive terminal side of the electric power source Vm from being remained in the ON state, in the present invention, Zener diodes ZD2~ZD4 each having a Zener voltage similar to the Zener voltage of the Zener diode ZD1 are inserted between the output terminals of the driver circuit U1 and the control signal input terminals of the power switching transistors Tr1 to Tr3, respectively, so that the voltage at each of the control signal input terminals of the power switching transistors Tr1 to Tr3 is reduced by the Zener voltage similar to that of the Zener diode ZD1.

Further, according to the present invention, it is not necessary to insert any Zener diodes between the output terminals of the driver circuit U1 and the control signal input terminals of the power switching transistors Tr4 to Tr6 at the negative terminal side of the electric power source Vm, respectively, because the voltage at the control signal input terminal of each of the power switching transistors Tr4 to Tr6 is not elevated to a level more than ON level above the grand level, so that the Zener diode ZD1 is not affected.

According to the driving circuit of the stepping motor of the present invention, the stepping motor can be driven at a higher speed with a larger torque and a low cost by using the common direct current electric power source and the general purpose driver circuit.

While the invention has been particularly shown and described with reference to the preferred embodiments thereof, it will be understood by those skilled in the art that various changes in form and details may be made therein without departing from the spirit and scope of the invention as defined by the appended claims.

What is claimed is:

1. A driving circuit of a stepping motor comprising an excitation control circuit connected to windings of a stepping motor, a driver circuit consisting of power switching transistors at a positive terminal side of a power source and of power switching transistors at a negative terminal side of the power source for controlling the excitation control circuit, a Zener diode inserted between the power source and a power input terminal of the driver circuit, and Zener diodes inserted between output terminals of the driver circuit and control signal input terminals of the power switching transistors at the positive terminal side of the power source, respectively, wherein the Zener voltage of the Zener diode for the power switching transistor is determined to a value not less than a voltage difference between the voltage of the power source and the maximum rated voltage of the driver circuit.

2. The driving circuit of a stepping motor according to claim 1, in which the number of the power switching transistors at the positive side of power source is selected to be three, and the number of the power switching transistors at the negative side of power source is selected to be three.

3. The driving circuit of a stepping motor according to claim 2, in which the number of the windings of the stepping motor is selected to be three.

* * * * *